United States Patent
Caldwell et al.

(10) Patent No.: US 12,294,184 B2
(45) Date of Patent: May 6, 2025

(54) LEGIBLE CONFIRMATION OF MATED CONNECTION SYSTEM

(71) Applicant: Aptiv Technologies AG, Schaffhausen (CH)

(72) Inventors: Bart N. Caldwell, Farmington, OH (US); John D. Schneider, Warren, OH (US); John G. Kountz, Poland, OH (US); Michael J. DeMonica, Cortland, OH (US)

(73) Assignee: Aptiv Technologies AG, Schaffhausen (CH)

( * ) Notice: Subject to any disclaimer, the term of this patent is extended or adjusted under 35 U.S.C. 154(b) by 407 days.

(21) Appl. No.: 17/948,326

(22) Filed: Sep. 20, 2022

(65) Prior Publication Data
US 2023/0088130 A1    Mar. 23, 2023

Related U.S. Application Data

(60) Provisional application No. 63/308,215, filed on Feb. 9, 2022, provisional application No. 63/246,439, filed on Sep. 21, 2021.

(51) Int. Cl.
*H01R 13/641*    (2006.01)
*G06K 7/00*    (2006.01)
(Continued)

(52) U.S. Cl.
CPC ......... *H01R 13/641* (2013.01); *G06K 7/1417* (2013.01); *G06K 7/1439* (2013.01);
(Continued)

(58) Field of Classification Search
CPC ............ H01R 13/465; H01R 13/62905; H01R 13/62944; H01R 13/641; H01R 43/26
See application file for complete search history.

(56) References Cited

U.S. PATENT DOCUMENTS 6,561,841 B2 *   5/2003   Norwood ............. H01R 13/641
                                              439/286
6,817,891 B2 *  11/2004   Wrede ....................... G09F 3/00
                                              439/491

(Continued)

FOREIGN PATENT DOCUMENTS

DE   102006050708 A1   5/2008
EP      3297095 A1     3/2018
(Continued)

OTHER PUBLICATIONS

"Extended European Search Report", mailed on Dec. 21, 2022, 18 Pages.
(Continued)

*Primary Examiner* — Abdullah A Riyami
*Assistant Examiner* — Thang H Nguyen
(74) *Attorney, Agent, or Firm* — Billion & Armitage

(57) ABSTRACT

A connector assembly includes a first housing having an indicium imprinted thereon and a movable member movable from a first position configured to render the indicium illegible to an optical scanning device to a second position configured to render the indicium legible to the optical scanning device. The indicium is visible when the movable member is in the first position and when the movable member is in the second position. A method of mating a connector assembly having a movable member and an indicium imprinted thereon is also presented.

17 Claims, 10 Drawing Sheets

(51) Int. Cl.
*G06K 7/14* (2006.01)
*G06K 19/06* (2006.01)
*H01R 13/46* (2006.01)
*H01R 13/629* (2006.01)

(52) U.S. Cl.
CPC ..... *G06K 19/06037* (2013.01); *H01R 13/465* (2013.01); *H01R 13/62944* (2013.01)

(56) References Cited

U.S. PATENT DOCUMENTS

| | | | |
|---|---|---|---|
| 9,054,459 B2* | 6/2015 | Guillanton | H01R 13/641 |
| 9,583,860 B1* | 2/2017 | DeWitte | H01R 13/465 |
| 10,431,933 B2* | 10/2019 | Gibeau | H01R 24/20 |
| 10,855,032 B1* | 12/2020 | Davila Morales | H01R 13/6683 |
| 11,296,462 B2* | 4/2022 | Schneider | H01R 13/465 |
| 2019/0131609 A1* | 5/2019 | Fukushima | H01M 50/505 |
| 2021/0383081 A1* | 12/2021 | Pavlovic | B60L 3/04 |
| 2021/0384677 A1* | 12/2021 | Pavlovic | H01R 13/6691 |

FOREIGN PATENT DOCUMENTS

| | | | |
|---|---|---|---|
| EP | 3806247 A1 | 4/2021 | |
| JP | 2022147206 A | 10/2022 | |
| WO | 2013039043 A1 | 3/2013 | |
| WO | 2020169295 A1 | 8/2020 | |

OTHER PUBLICATIONS

"Extended European Search Report", mailed on Jan. 31, 2023, 7 Pages.

\* cited by examiner

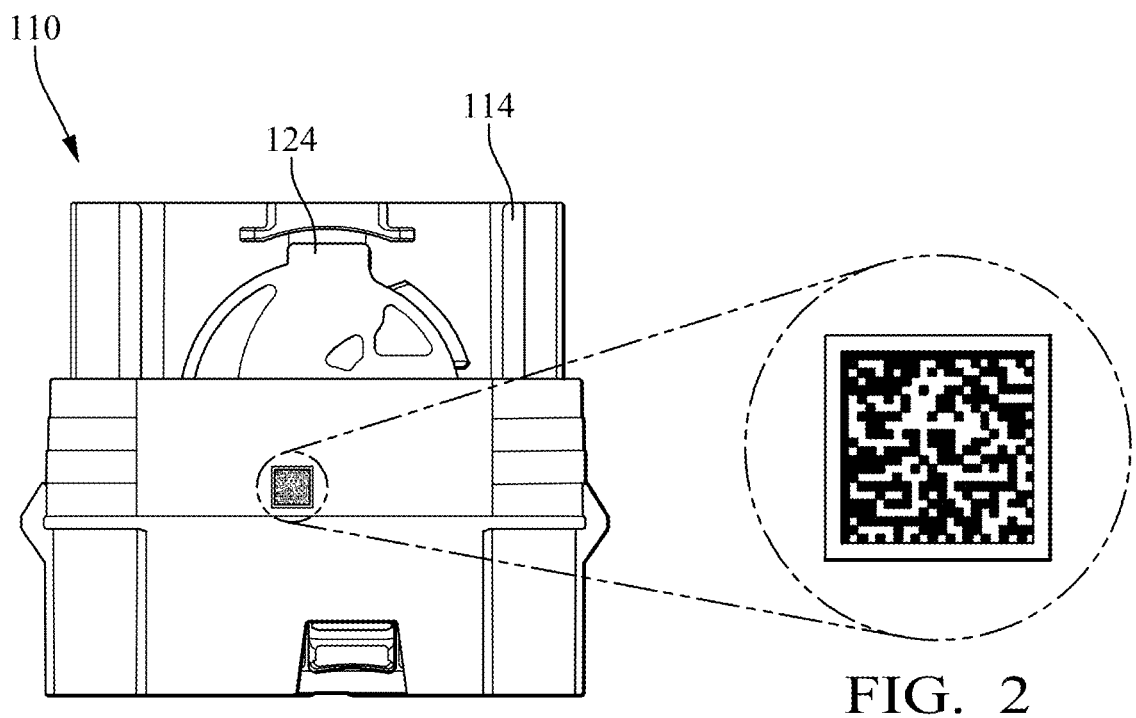
FIG. 1
FIG. 2
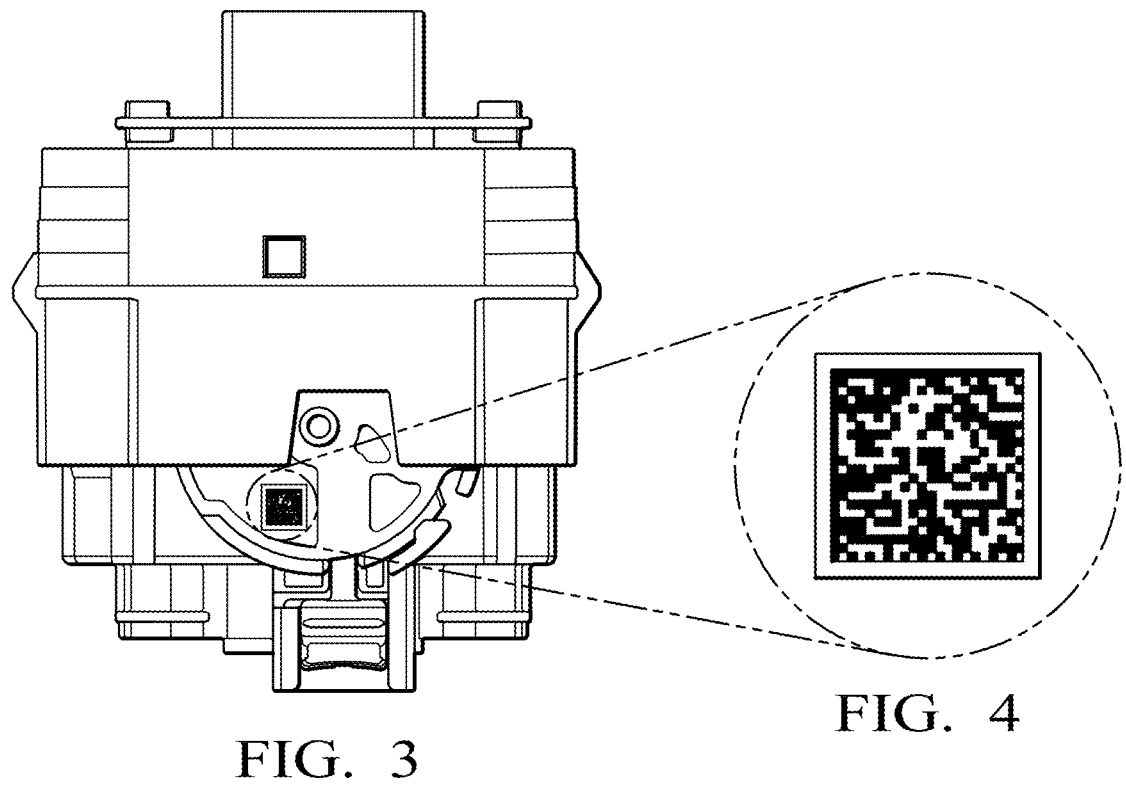
FIG. 3
FIG. 4

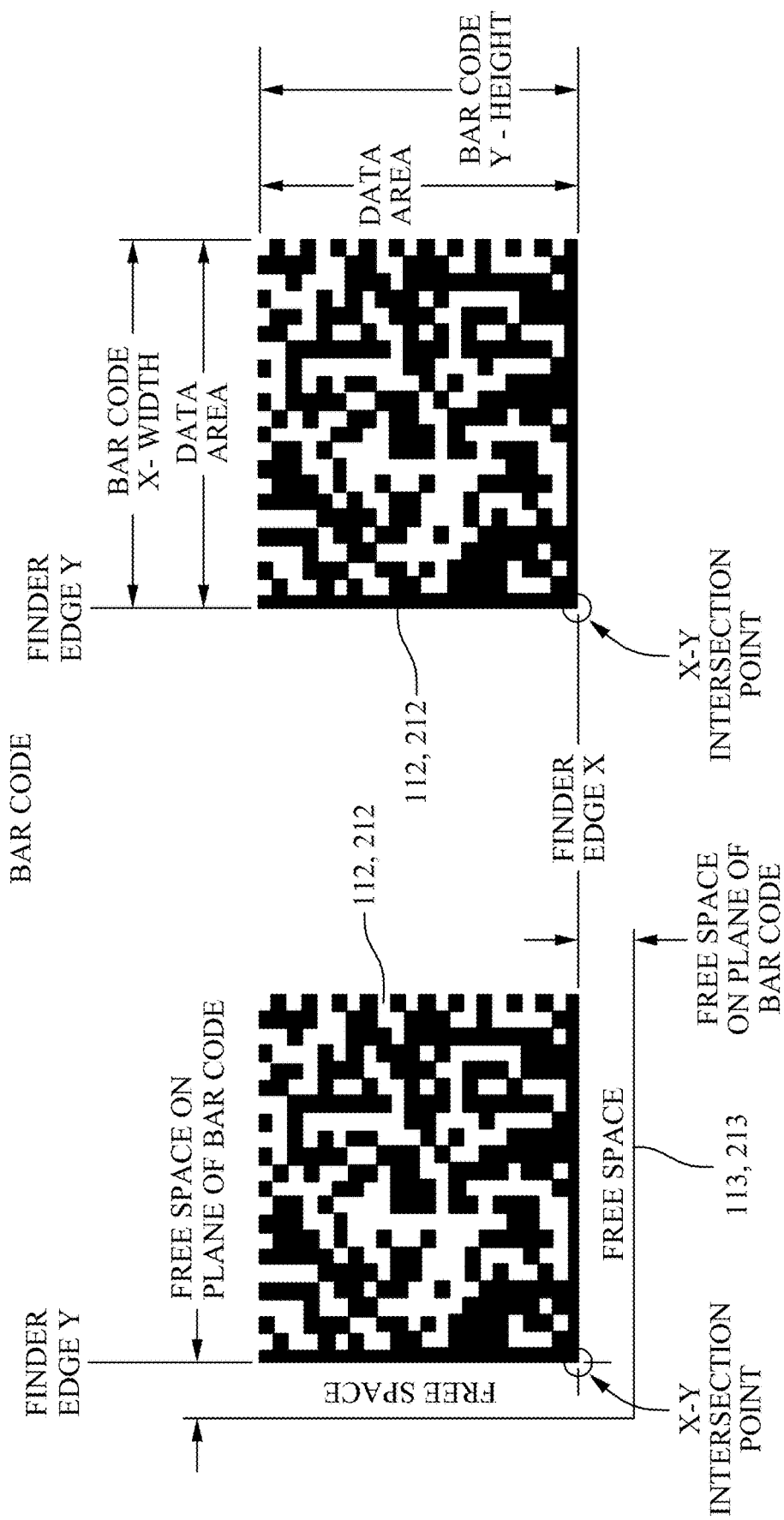

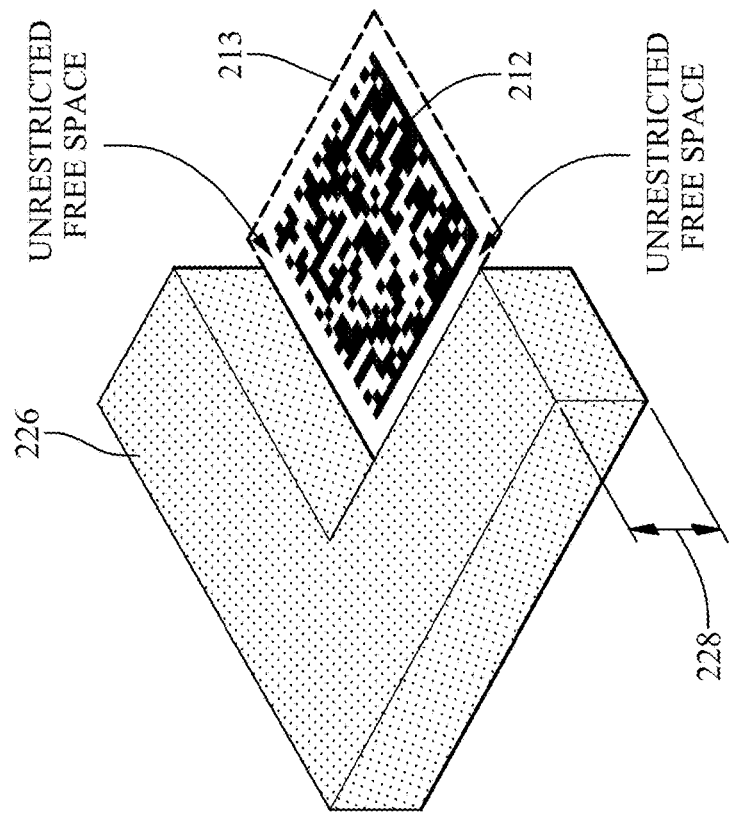
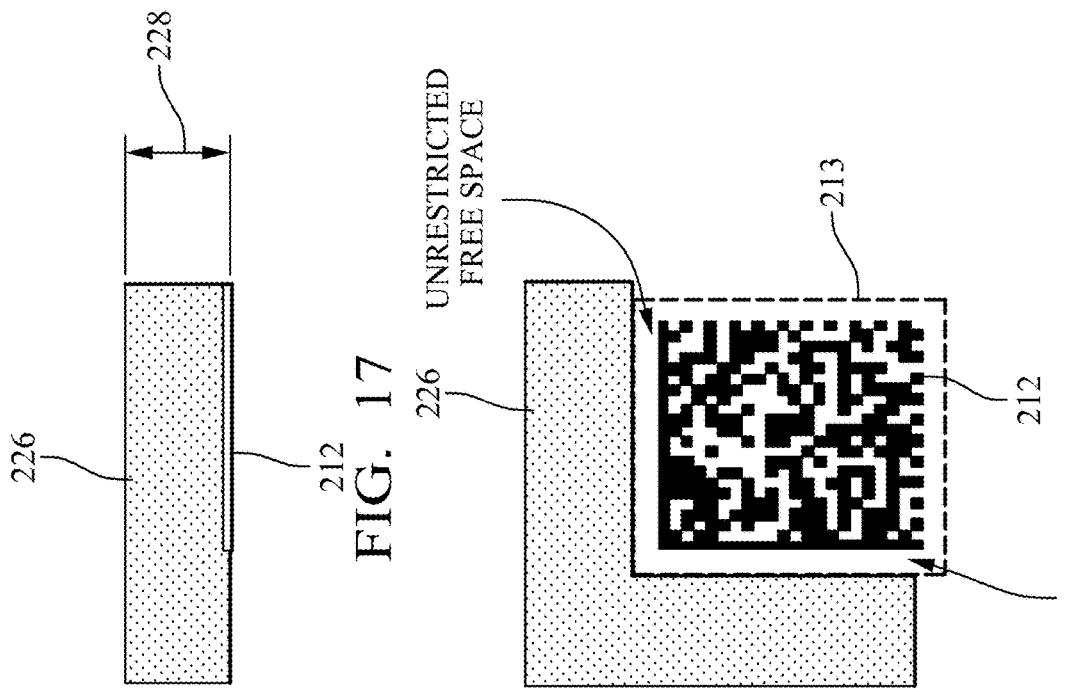
FIG. 17
FIG. 18
FIG. 19

LEGIBLE CONFIRMATION OF MATED CONNECTION SYSTEM

CROSS-REFERENCE TO RELATED APPLICATION

This application claims benefit of priority to U.S. Provisional Patent Application No. 63/308,215 filed on Feb. 9, 2022, and U.S. Provisional Patent Application No. 63/246,439 filed on Sep. 21, 2021, the entire disclosure of each of which is hereby incorporated by reference.

TECHNICAL FIELD

This invention generally relates to a method of legibly confirming proper and complete mating of a connection system, such as an electrical connection system and a connection system configured to legibly confirm proper and complete mating.

BACKGROUND

Automotive Original Equipment Manufacturers (OEMs) require methods to ensure that an electrical connector with wires is properly connected with a mating connector. To ensure the connection system is properly mated, a connector position assurance device (CPA) that is movable from a pre-staged position to a staged position only when the connector and mating connector are fully mated is provided. However, assembly operators may mate the connectors but fail to move the CPA to the staged position, thereby failing to assure that the connector is properly connected with the mating connector. In order to address this problem, OEMs require a way to verify that the connection system is fully mated and the CPA is in the staged position.

Some connection systems or connector assemblies include a recordable feature that is used to record and log a presence, position, characteristic, or other features of the connector assembly during a manufacturing process or an assembly process that verifies proper mating of the connector assembly. It may be useful to record that the connector assembly is properly mated to verify that a proper electrical connection has been made in the assembly process and/or to verify the presence of the connector assembly in a larger product that is being assembled, such as an automobile or an appliance. Such recorded data may then be stored in a database.

BRIEF SUMMARY

According to one or more aspects of the present disclosure, a connector assembly includes a first housing having an indicium imprinted thereon and a movable member movable from a first position configured to render the indicium illegible to an optical scanning device to a second position configured to render the indicium legible to the optical scanning device. The indicium is visible when the movable member is in the first position and when the movable member is in the second position.

In one or more embodiments of the connector assembly according to the previous paragraph, the movable member is configured to intrude into a quiet zone around the indicium when in the first position and wherein the movable member is outside of the quiet zone when in the second position.

In one or more embodiments of the connector assembly according to any one of the previous paragraphs, the movable member is configured to cover a portion of the quiet zone around the indicium when in the first position.

In one or more embodiments of the connector assembly according to any one of the previous paragraphs, the movable member is configured to cover a portion of the quiet zone on a corner of the indicium when in the first position.

In one or more embodiments of the connector assembly according to any one of the previous paragraphs, the movable member is configured to cover an entirety of the quiet zone around the indicium when in the first position.

In one or more embodiments of the connector assembly according to any one of the previous paragraphs, the indicium is visible through a first aperture in the movable member when in the first position, and wherein the movable member is clear of the indicium when the movable member is in the second position.

In one or more embodiments of the connector assembly according to any one of the previous paragraphs, the connector assembly further includes a rotating element having a second aperture. The indicium is visible through the second aperture when the movable member is in the second position.

In one or more embodiments of the connector assembly according to any one of the previous paragraphs, the movable member borders a quiet zone around the indicium when in the first position.

In one or more embodiments of the connector assembly according to any one of the previous paragraphs, a location of the movable member in the first position renders the indicium illegible to the optical scanning device when a height of the movable member exceeds a height threshold.

In one or more embodiments of the connector assembly according to any one of the previous paragraphs, the movable member is located farther from the indicium when in the second position than when in the first position.

In one or more embodiments of the connector assembly according to any one of the previous paragraphs, the movable member is configured to restrict a quiet zone around the indicium when in the first position and wherein the movable member provides adequate clearance of the quiet zone when in the second position.

According to one or more aspects of the present disclosure, a method of mating a connector assembly includes providing a first housing having a movable member attached thereto and an indicium imprinted thereon, connecting the first housing to a second housing and moving the movable member from a first position configured to render the indicium illegible to an optical scanning device to a second position configured to render the indicium legible to the optical scanning device. The indicium is visible when the movable member is in the first position and when the movable member is in the second position.

In one or more embodiments of the method according to the previous paragraph, the movable member is configured to intrude into a quiet zone around the indicium when in the first position. The movable member is outside of the quiet zone when in the second position.

In one or more embodiments of the method according to any one of the previous paragraphs, the method further includes covering a portion of the quiet zone around the indicium when in the first position.

In one or more embodiments of the method according to any one of the previous paragraphs, the method further includes covering a portion of the quiet zone on a corner of the indicium when in the first position.

In one or more embodiments of the method according to any one of the previous paragraphs, the method further includes covering an entirety of the quiet zone around the indicium when in the first position.

In one or more embodiments of the method according to the previous paragraph, the indicium is visible through a first aperture in the movable member when in the first position and the movable member is clear of the indicium when the movable member is in the second position.

In one or more embodiments of the method according to any one of the previous paragraphs, the method further includes arranging the movable member to border a quiet zone around the indicium when in the first position.

In one or more embodiments of the method according to the previous paragraph, a location of the movable member in the first position renders the indicium illegible to the optical scanning device when a height of the movable member exceeds a height threshold.

In one or more embodiments of the method according to the previous paragraph, the movable member is located farther from the indicium when in the second position than when in the first position.

BRIEF DESCRIPTION OF THE DRAWINGS

The present invention will now be described, by way of example with reference to the accompanying drawings, in which:

FIG. 1 shows a top view of a first connector with a movable member in a pre-staged position according to some embodiments;

FIG. 2 shows a close up view of restricting a quiet zone (restricted free space) around an indicium according to some embodiments;

FIG. 3 shows a top view of a connector assembly showing the first connector of FIG. 1 with the movable member in a staged position according to some embodiments;

FIG. 4 shows a close up view of providing adequate clearance of the quiet zone (unrestricted free space) around the indicium according to some embodiments;

FIGS. 13 and 14 show parts of a 2D barcode;

FIG. 17 shows a side view of a structure bordering a 2D bar code according to some embodiments;

FIG. 18 shows a top view of a structure bordering a 2D bar code according to some embodiments; and FIG. 19 shows a perspective view of a structure bordering a 2D bar code according to some embodiments.

In the various illustrated embodiment, similar elements share the last two digits of the reference numbers.

DETAILED DESCRIPTION

Figure 5:
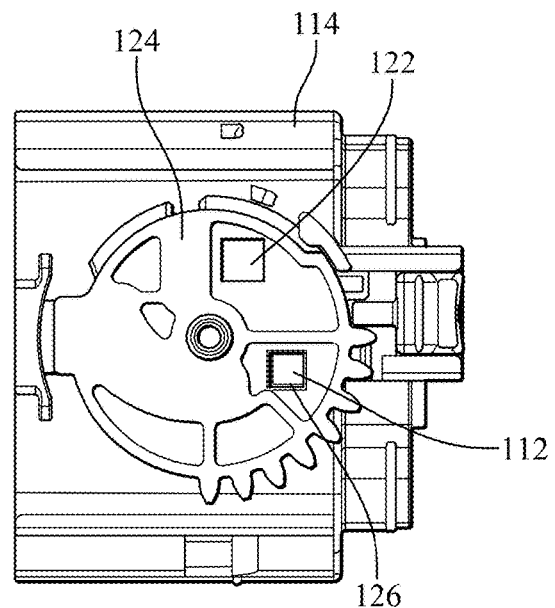
FIG. 5 shows a top view of the first connector with the movable member removed in the pre-staged position according to some embodiments.

A connector assembly 110 is illustrated in FIGS. 1 to 12. The connector assembly 110 includes an indicium 112, e.g., a two-dimensional barcode that can be used to automatically verify and record a first housing 114 of the connector assembly 110 being fully mated with a second housing 116 of the connector assembly 110. An optical scanning device, hereafter referred to as a bar code reader, that is used to read the indicium 112 needs unrestricted free space, hereafter referred to as a "quiet zone" 113 around the indicium 112 in order to successfully read the indicium 112. The quiet zone 113 is a zone or area surrounding or partially surrounding a barcode or 2D symbol that must be kept free of text, marks, or obstacles (also referred to as the "no-print zone"). All barcode readers have tolerances for minimum allowable quiet zone size. This quiet zone or space provides separation from surrounding marks, allowing the reader to "see" the barcode in its entirety. In 1D barcodes, the quiet zone lies to the left and right ends of the barcode. As a general rule, a width of the quiet zone on the left and right sides should be a minimum of 10 times the width of the narrowest bar in the 1D barcode. In 2D barcodes, the quiet zone is the space surrounding the entire barcode. Quiet zone requirements for 2D barcodes are prescribed by the Association for Automatic Identification and Mobility (AIM), which specifies at least a width of one of the smallest elements (or cells) on each side of the 2D barcode. For best results with large 2D barcodes, it is typically recommended that the quiet zone be 10% of the barcode height or width in the X (longitudinal) and Y (lateral) axes, whichever is smaller.

In the illustrated example, the connector assembly 110 is an electrical connector assembly comprising a first connector that is configured to be directly mated to a second or mating connector. The first connector includes the first housing 114 and the second connector includes the second housing 116. The first and second housings 114, 116 contain electrical terminals (not shown) that are configured to make electrical connections between wires, circuit board traces, etc. The first housing 114 defines the indicium 112, and a movable member 118 defines a first aperture 120. The first aperture 120 is sized such that the indicium 112 is visible through the first aperture 120 when the movable member 118 is in a pre-staged position 121 shown in FIG. 1. Preferably, the indicium 112 is fully visible through the first aperture 120 when the movable member 118 is in the pre-staged position. Even though the indicium 112 is fully visible when the movable member 118 is in the pre-staged position 121, the first aperture 120 is sized such that the movable member 118 restricts or intrudes upon the quiet zone 113 around the indicium 112 such that the contrast between the outer edge of the indicium 112 and the space around the indicium 112 is low or inconsistent, see FIG. 2, thereby making the indicium 112 illegible to the optical scanning device.

Figure 9:
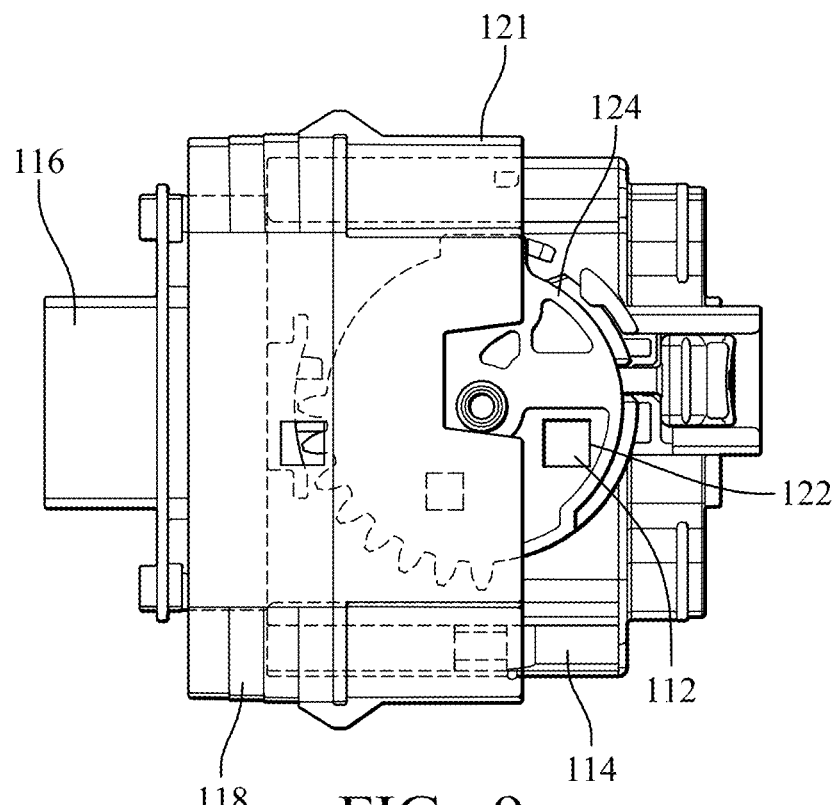
FIG. 9 shows a top view of the connector assembly showing the first connector with the movable member shown in the staged position according to some embodiments.
Figure 10:
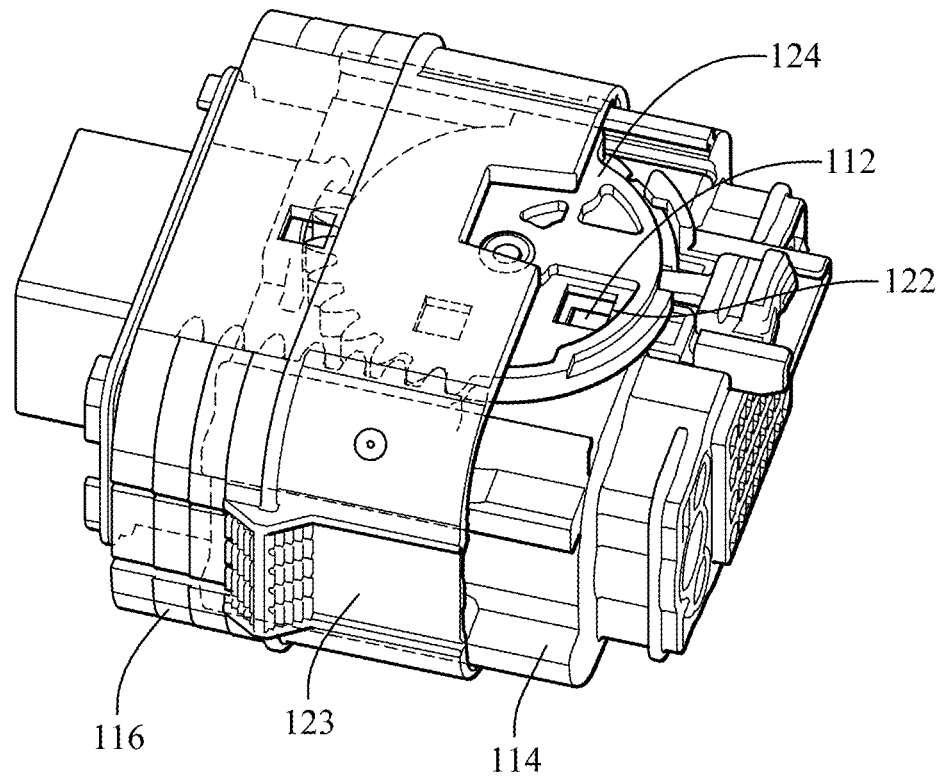
FIG. 10 shows a perspective view of the connector assembly showing the first connector with the movable member shown in the staged position according to some embodiments.

The movable member 118 moves or is movable to a staged position 123, illustrated in FIG. 3, as the first and second housings 114, 116, are connected together and fully mated. In the staged position 123, the indicium 112 is fully visible through a second aperture 122 in a rotating gear member 124, as shown in FIGS. 3 and 9. The second aperture 122 is sized such that the movable member 118 provides adequate clearance of the quiet zone 113 around the indicium 112 thereby allowing the indicium 112 to be legible to the optical scanning device as shown in FIG. 4. In some embodiments the second aperture 122 is larger than the first aperture 120.

Figure 6:
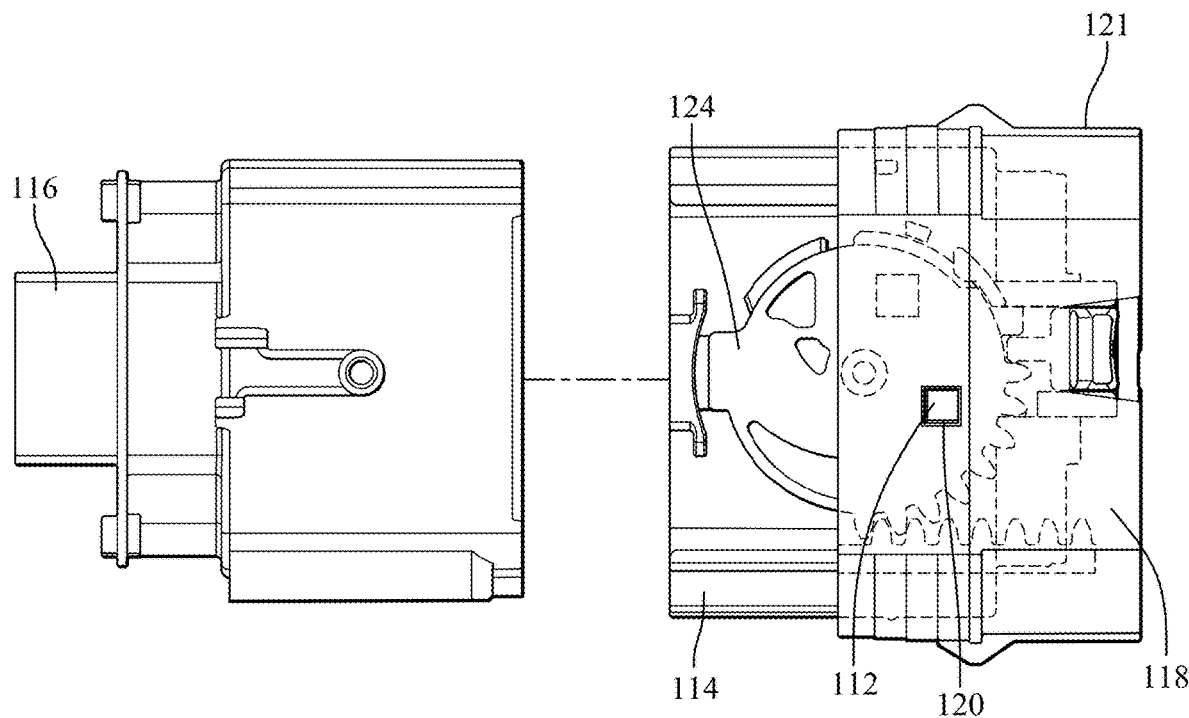
FIG. 6 shows a top view of the connector assembly showing the first connector with the movable member in the pre-staged position according to some embodiments.
Figure 7:
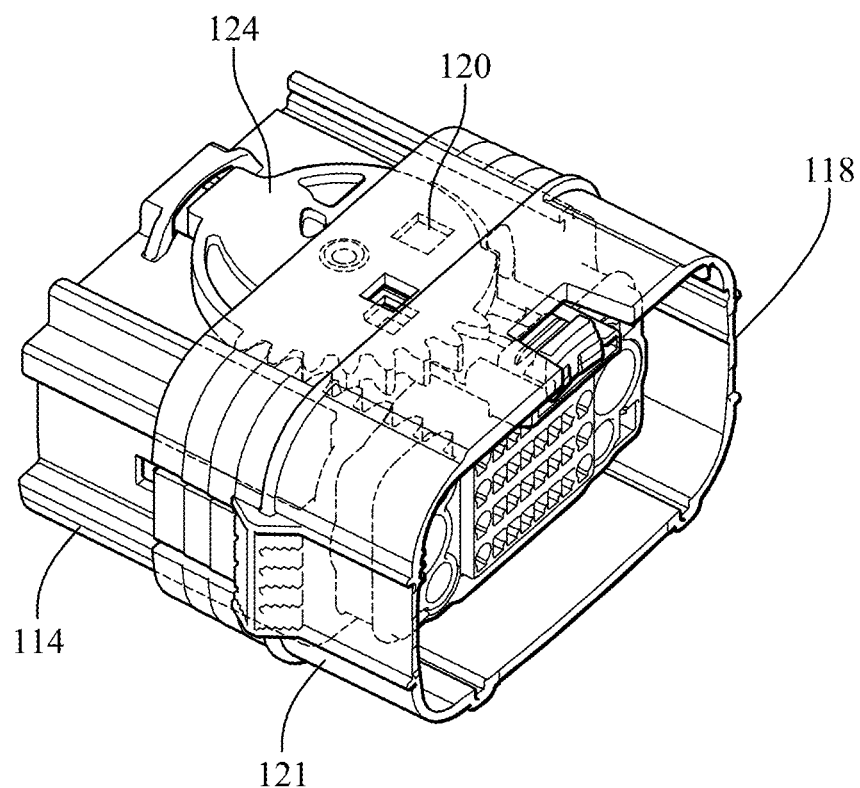
FIG. 7 shows a perspective view of the first connector with the movable member shown in the pre-staged position according to some embodiments.
Figure 8:
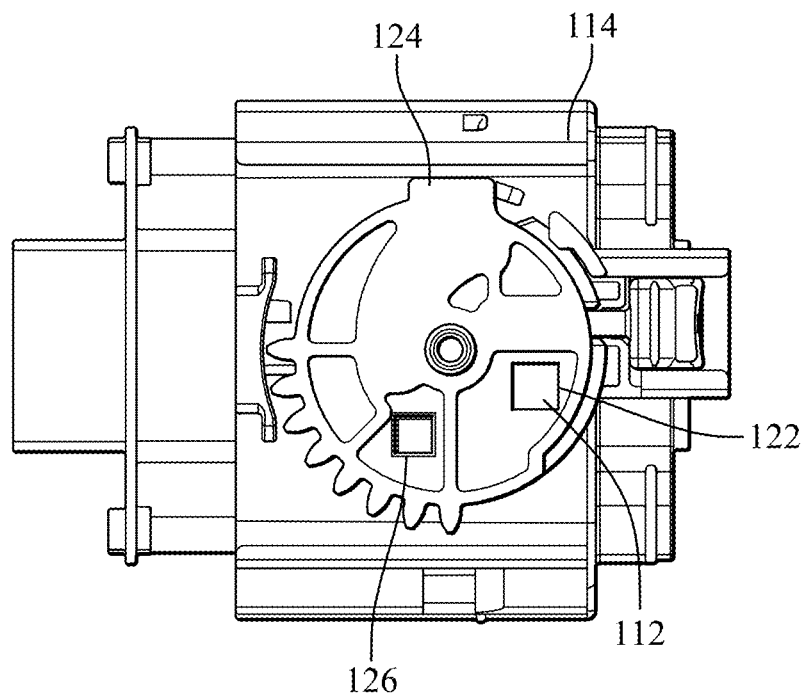
FIG. 8 shows a top view of the connector assembly showing the first connector with the movable member removed in the staged position according to some embodiments.

The rotating gear member 124 also defines a third aperture 126 shown in FIG. 5 that is aligned with the indicium 112 and the first aperture 120 in the movable member 118 when the rotating gear member 124 is in a first rotated position and the movable member 118 is in the pre-staged position 121 shown in FIGS. 6 and 7, thereby allowing the indicium 112 to be visible through the first aperture 120 and the third aperture 126. The second aperture 122 of the rotating gear member 124 is aligned with the indicium 112 when the rotating gear member 124 is in a second rotated position and the movable member 118 is in the staged position shown in FIGS. 9 and 10, thereby allowing the indicium 112 to be visible through the second aperture 122. As shown in FIG. 8, the third aperture 126 is moved away from the indicium 112 when the rotating gear member 124 is in the second rotated position.

In an alternative embodiment, the indicum may be printed on a movable member, e.g., a CPA device, and the connector housing may define a first aperture in which the indicum is fully visible when the movable member is in the pre-staged position. This first aperture is sized to restrict the quiet zone around the indicium such that the contrast between the outer edge of the indicium and the quiet zone around the indicium is low or inconsistent, thereby making the indicium illegible to the optical scanning device. The connector housing also defines a second aperture in which the indicum is fully visible when the movable member is in the staged position. This second aperture is sized such that the connector housing provides adequate clearance of the quiet zone around the indicium thereby allowing the indicium to be legible to the optical scanning device.

In another alternative embodiment, the indicum may be printed on the first housing 114 and a movable member of the second housing 116 may define a first aperture in which the indicum is fully visible when the movable member is in a pre-staged position. This first aperture is sized such that the movable member of the second housing 116 restricts the quiet zone 113 around the indicium such that the contrast between the outer edge of the indicium and the space around the indicium is low or inconsistent, thereby making the indicium illegible to the optical scanning device. The movable member also defines a second aperture in which the indicum is fully visible when the movable member is in a staged position. This second aperture is sized such that the movable member of the second housing 116 provides adequate clearance of the quiet zone 113 around the indicium thereby allowing the indicium to be legible to the optical scanning device.

In yet another alternative embodiment, the indicum may be printed on the second housing 116 and a movable member of the first housing 114 may define a first aperture in which the indicum is fully visible when the movable member is in a pre-staged position. This first aperture is sized such that the movable member of the first housing 114 restricts the quiet zone 113 around the indicium such that the contrast between the outer edge of the indicium and the space around the indicium is low or inconsistent, thereby making the indicium illegible to the optical scanning device. The movable member also defines a second aperture in which the indicum is fully visible when the movable member is in a staged position. This second aperture is sized such that the movable member of the first housing 114 provides adequate clearance of the quiet zone 113 around the indicium to allow the indicium to be legible to the optical scanning device.

Figure 11:
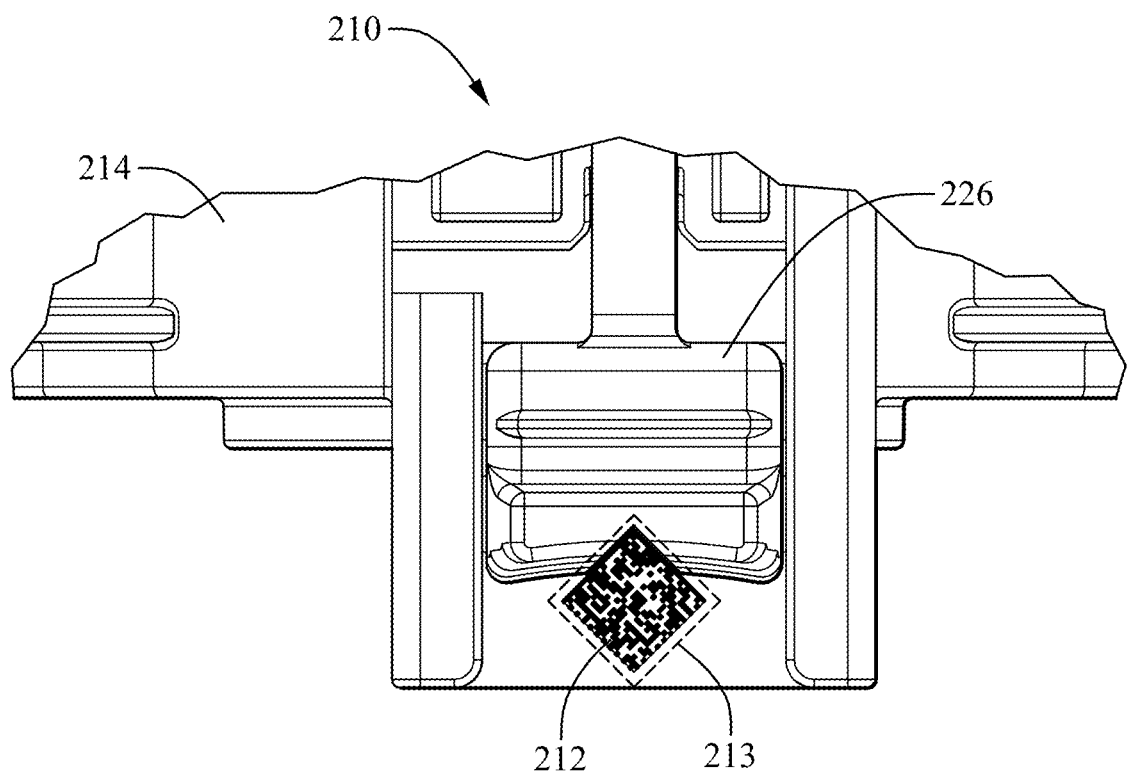
FIG. 11 shows a top view of another connector assembly with a movable member in a pre-staged position according to some embodiments.
Figure 12:
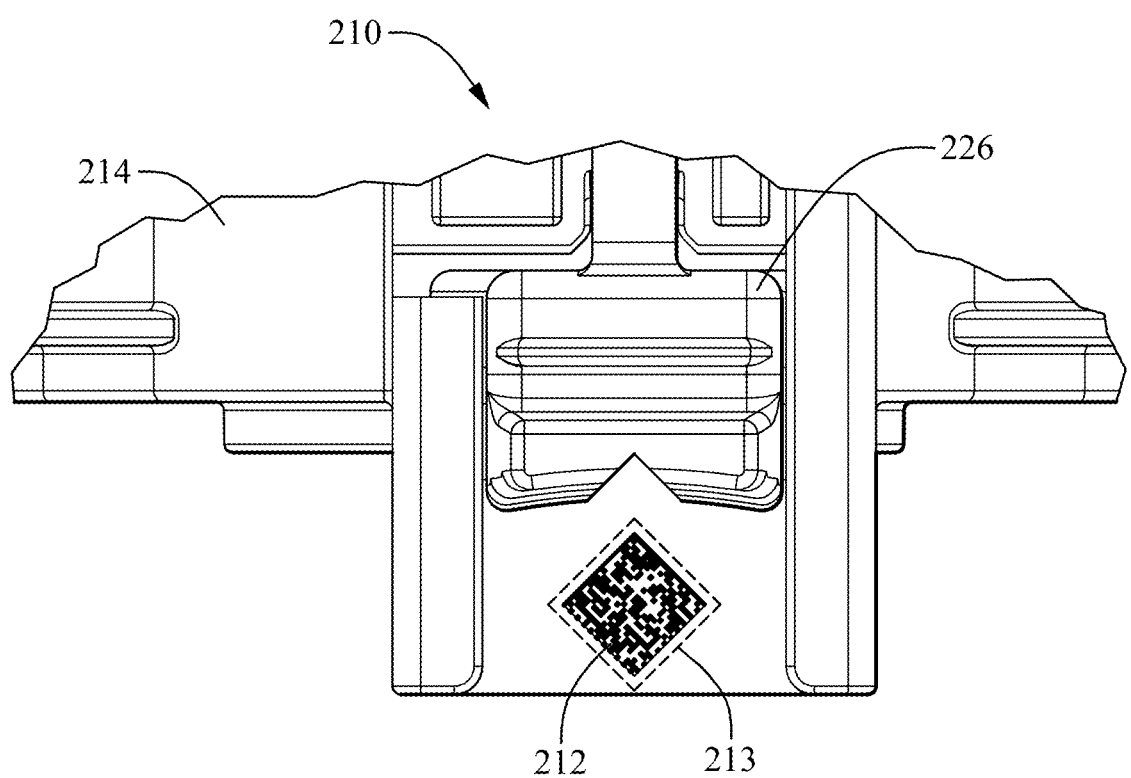
FIG. 12 shows a top view of the connector assembly of FIG. 11 with the movable member in a staged position according to some embodiments.

FIGS. 11 and 12. illustrate an alternative connector assembly 210 having an indicum 212 imprinted on a first connector housing 214. When a movable member 226, in this non-limiting example a CPA device, of the first connector housing 214 is in a pre-staged position as shown in FIG. 11, the movable member 226 is located adjacent at least two edges of the indicium 212, thereby restricting the quiet zone 213 around the indicium 212 and making it illegible to an optical scanning device. When the first connector housing 214 is mated to a second connector housing (not shown) and the movable member 226 is in a staged position, as shown in FIG. 12, the movable member 226 is moved away from the indicium 212 such that the movable member 226 provides adequate clearance of the quiet zone 213 around the indicium 212 and making it legible to the optical scanning device.

FIGS. 13 and 14 illustrate the various elements of a 2D bar code and the quiet zone 113 needed for the bar code to be legible.

Figure 16:
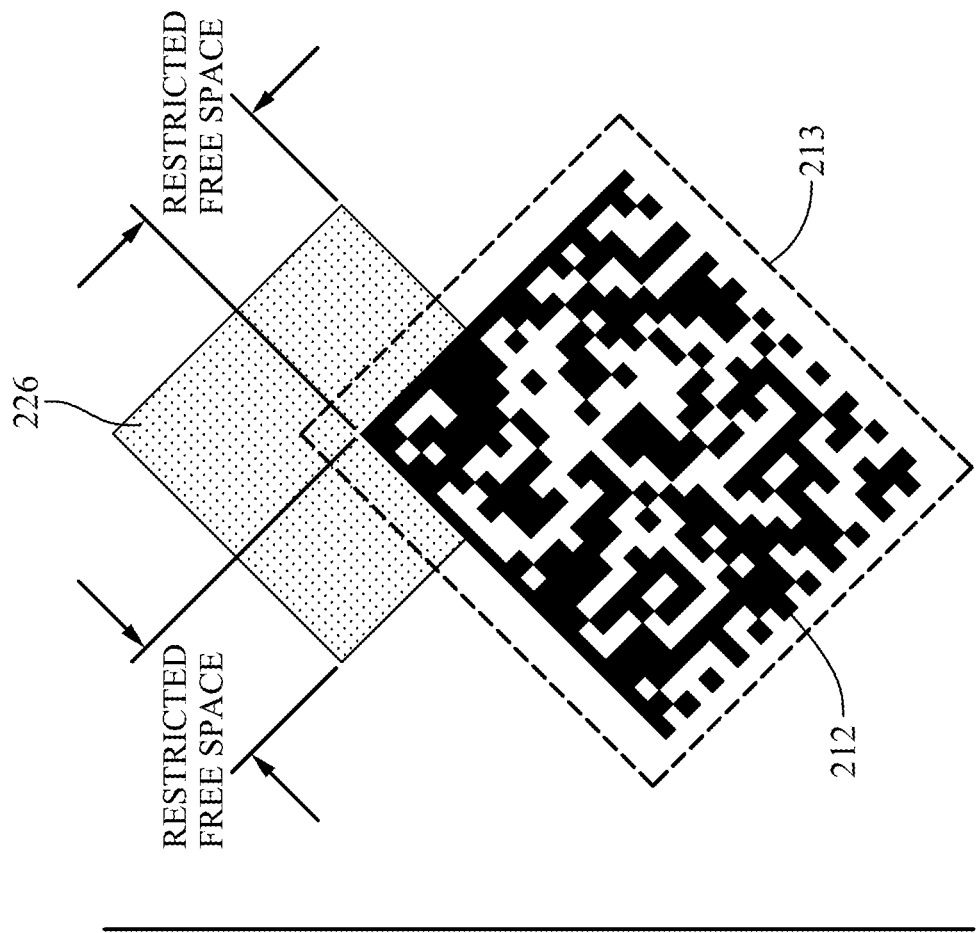
FIG. 16 shows a method of restricting a corner of a quiet zone (restricted free space) around a 2D bar code according to some embodiments.
Figure 15:
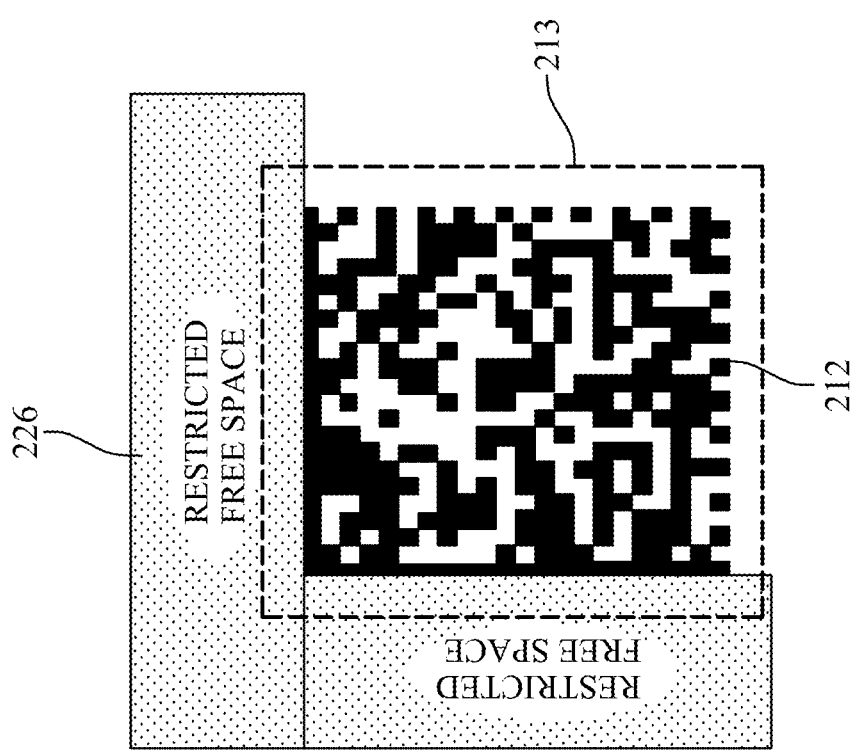
FIG. 15 shows a method of restricting an edge of a quiet zone (restricted free space) around a 2D bar code according to some embodiments.

FIGS. 15 and 16 illustrate two different ways that the quiet zone 113 around a 2D bar code can be restricted to make the 2D bar code illegible to an optical scanning device.

Figure 20B:
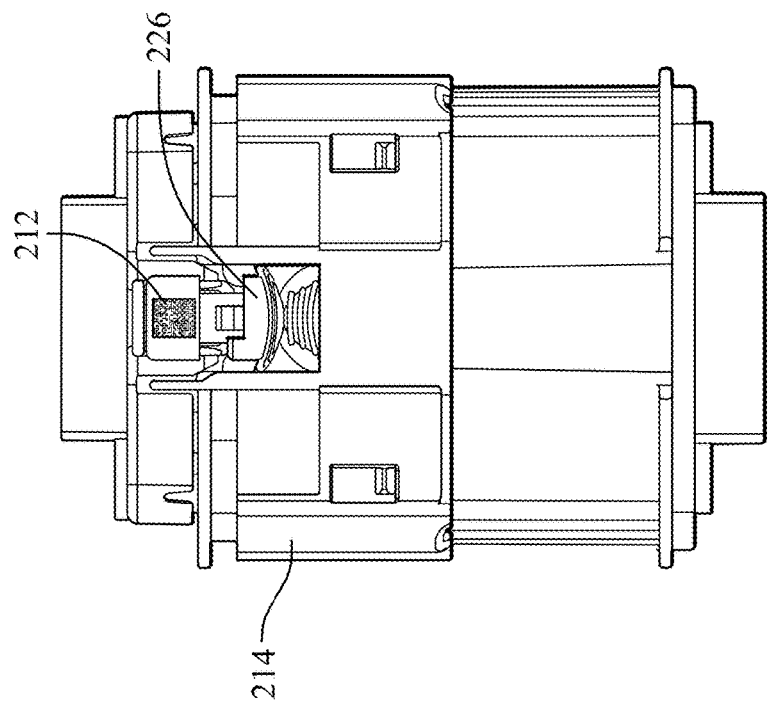
FIG. 20B shows a top view of a connector assembly showing the first connector of FIG. 20A with the movable member in a staged position according to some embodiments.
Figure 20A:
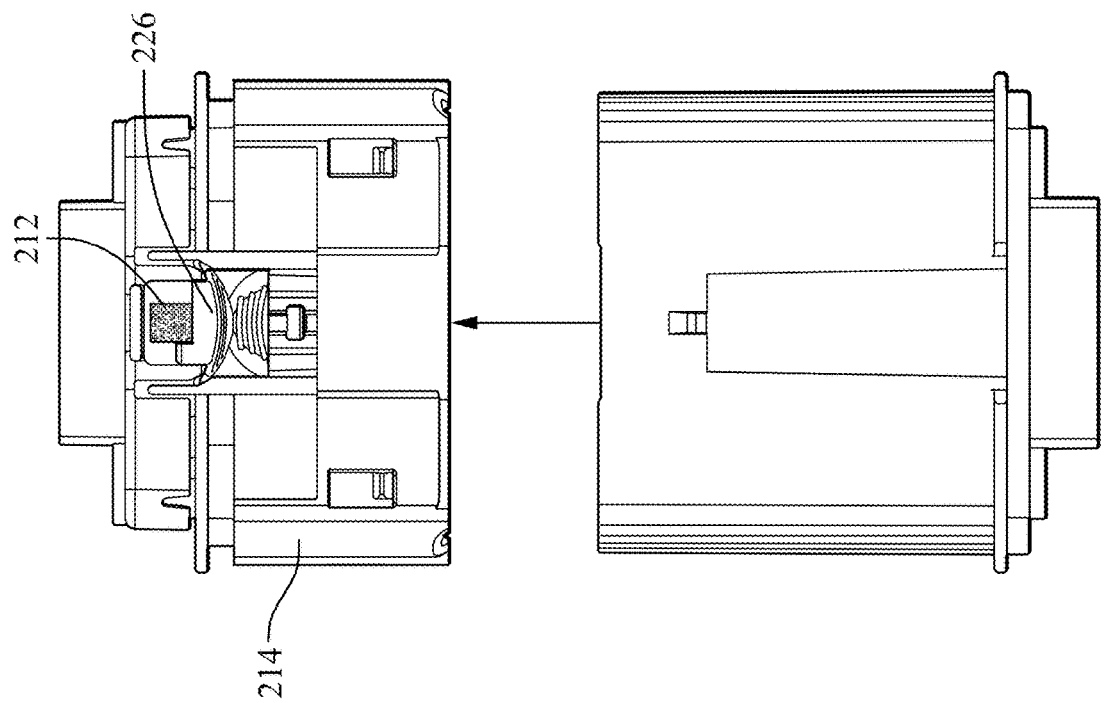
FIG. 20A shows a top view of a first connector with a movable member in a pre-staged position according to some embodiments.
Figure 21B:
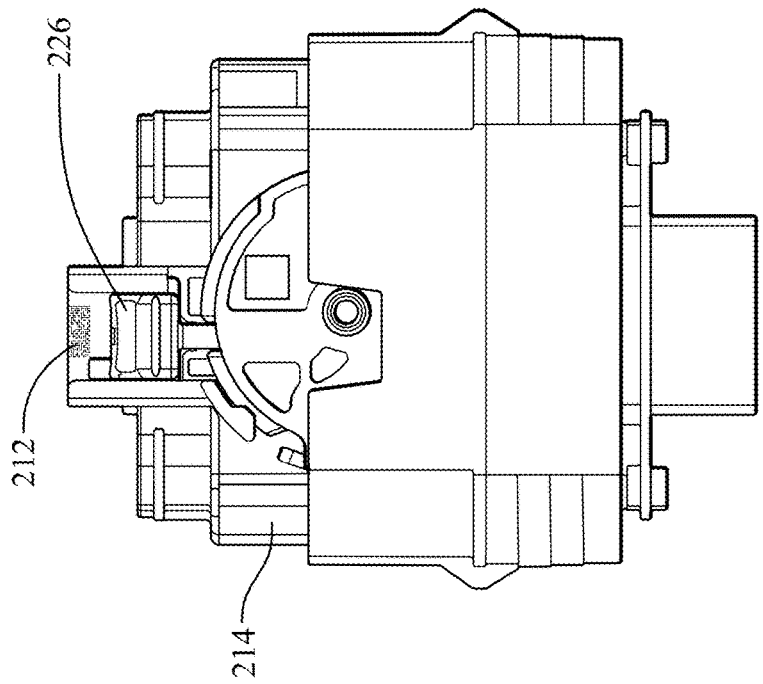
FIG. 21B shows a top view of a connector assembly showing the first connector of FIG. 21A with the movable member in a staged position according to some embodiments.
Figure 21A:
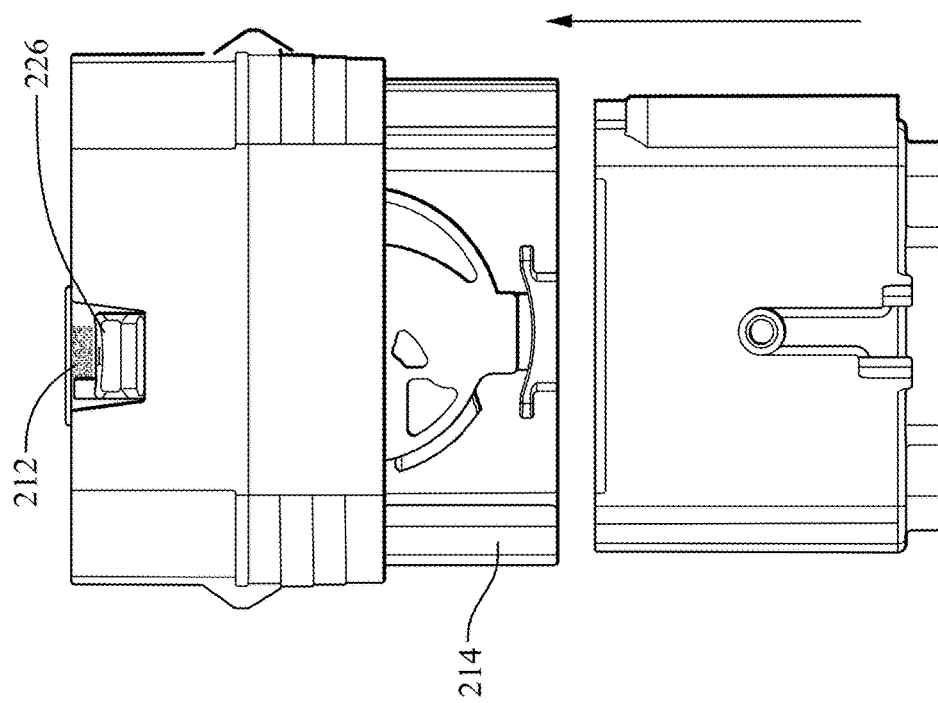
FIG. 21A shows a top view of a first connector with a movable member in a pre-staged position according to some embodiments.

As illustrated in FIGS. 17, 18, and 19, the inventors have also discovered that legibility of a bar code is affected by the height in the Z (vertical) axis of the movable member 226 bordering the quiet zone 213, even if the movable member 226 is outside of the quiet zone 213 of the bar code 212. The bar code 212 is rendered illegible to barcode readers when the thickness of the movable member 226 exceeds a height threshold 228. The inventors have also found that this height threshold 228 is dependent upon the barcode reading technology that is used to read the bar code 212. This may also be implemented by varying the thickness of the movable member 118 around the first aperture 120 and the thickness of the rotating gear member 124 around the second aperture 122. Examples of two different connector types employing this feature are shown in FIGS. 20A-B and FIGS. 21A-B. In FIGS. 20A and 21A, the movable members 226 are in the pre-staged position and are outside the quiet zone around the bar code 212. Nonetheless, the bar code 212 is rendered illegible to the optical scanning device due to the height of the movable members 226. In FIGS. 20B and 21B, the movable members 226 are in the staged position and are outside the quiet zone around the bar code 212. With the movable members 226 in the staged position the bar code 212 is legible to the optical scanning device.

While the example presented herein is directed to an electrical connector assembly, alternative embodiments of the connector assembly may be envisioned that are configured to interconnect fiber optic cables, pneumatic tubes, hydraulic tubes, or a hybrid connector assembly having a combination of any of these types of conductors. In addition, while the indicium in the illustrated examples is a data matrix 2D bar code, in alternative embodiments the indicium may be other bar code types, such as linear bar code or a quick response (QR) code.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A connector assembly, comprising:
a first housing having an indicium imprinted thereon; and
a movable member movable from a first position configured to render the indicium illegible to an optical scanning device to a second position configured to render the indicium legible to the optical scanning device, the indicium being visible when the movable member is in the first position and when the movable member is in the second position, the movable member being configured to intrude into a quiet zone around the indicium when in the first position, and the movable member being outside of the quiet zone when in the second position.

2. The connector assembly in accordance with claim 1, wherein the movable member is configured to cover a portion of the quiet zone around the indicium when in the first position.

3. The connector assembly in accordance with claim 2, wherein the movable member is configured to cover a portion of the quiet zone on a corner of the indicium when in the first position.

4. The connector assembly in accordance with claim 2, wherein the movable member is configured to cover an entirety of the quiet zone around the indicium when in the first position.

5. A connector assembly, comprising:
a first housing having an indicium imprinted thereon;
a movable member movable from a first position configured to render the indicium illegible to an optical scanning device to a second position configured to render the indicium legible to the optical scanning device, the indicium being visible when the movable member is in the first position and when the movable member is in the second position, the indicium being visible through a first aperture in the movable member when in the first position, and the movable member being clear of the indicium when the movable member is in the second position; and
a rotating element having a second aperture, the indicium being visible through the second aperture when the movable member is in the second position.

6. A connector assembly, comprising:
a first housing having an indicium imprinted thereon; and
a movable member movable from a first position configured to render the indicium illegible to an optical scanning device to a second position configured to render the indicium legible to the optical scanning device, the indicium being visible when the movable member is in the first position and when the movable member is in the second position, the movable member bordering a quiet zone around the indicium when in the first position.

7. The connector assembly in accordance with claim 6, wherein a location of the movable member in the first position renders the indicium illegible to the optical scanning device when a height of the movable member exceeds a height threshold.

8. The connector assembly in accordance with claim 6, wherein the movable member is located farther from the indicium when in the second position than when in the first position.

9. A connector assembly, comprising:
a first housing having an indicium imprinted thereon; and
a movable member movable from a first position configured to render the indicium illegible to an optical scanning device to a second position configured to render the indicium legible to the optical scanning device, the indicium being visible when the movable member is in the first position and when the movable member is in the second position, wherein the movable member being configured to restrict a quiet zone around the indicium when in the first position and the movable member providing adequate clearance of the quiet zone when in the second position.

10. A method of mating a connector assembly, comprising:
providing a first housing having a movable member attached thereto and an indicium imprinted thereon;
connecting the first housing to a second housing; and
moving the movable member from a first position configured to render the indicium illegible to an optical scanning device to a second position configured to render the indicium legible to the optical scanning device, the indicium being visible when the movable member is in the first position and when the movable member is in the second position, the movable member being configured to intrude into a quiet zone around the indicium when in the first position, and the movable member being outside of the quiet zone when in the second position.

11. The method in accordance with claim 10, further comprising covering a portion of the quiet zone around the indicium when in the first position.

12. The method in accordance with claim 11, further comprising covering a portion of the quiet zone on a corner of the indicium when in the first position.

13. The method in accordance with claim 11, further comprising covering an entirety of the quiet zone around the indicium when in the first position.

14. The method in accordance with claim 10, wherein the indicium is visible through a first aperture in the movable member when in the first position, and wherein the movable member is clear of the indicium when the movable member is in the second position.

15. A method of mating a connector assembly, comprising:
providing a first housing having a movable member attached thereto and an indicium imprinted thereon;
connecting the first housing to a second housing;
moving the movable member from a first position configured to render the indicium illegible to an optical scanning device to a second position configured to render the indicium legible to the optical scanning device, the indicium being visible when the movable member is in the first position and when the movable member is in the second position; and
arranging the movable member to border a quiet zone around the indicium when in the first position.

16. The method in accordance with claim 15, wherein a location of the movable member in the first position renders the indicium illegible to the optical scanning device when a height of the movable member exceeds a height threshold.

17. The method in accordance with claim 15, wherein the movable member is located farther from the indicium when in the second position than when in the first position.

* * * * *